Figure 1:
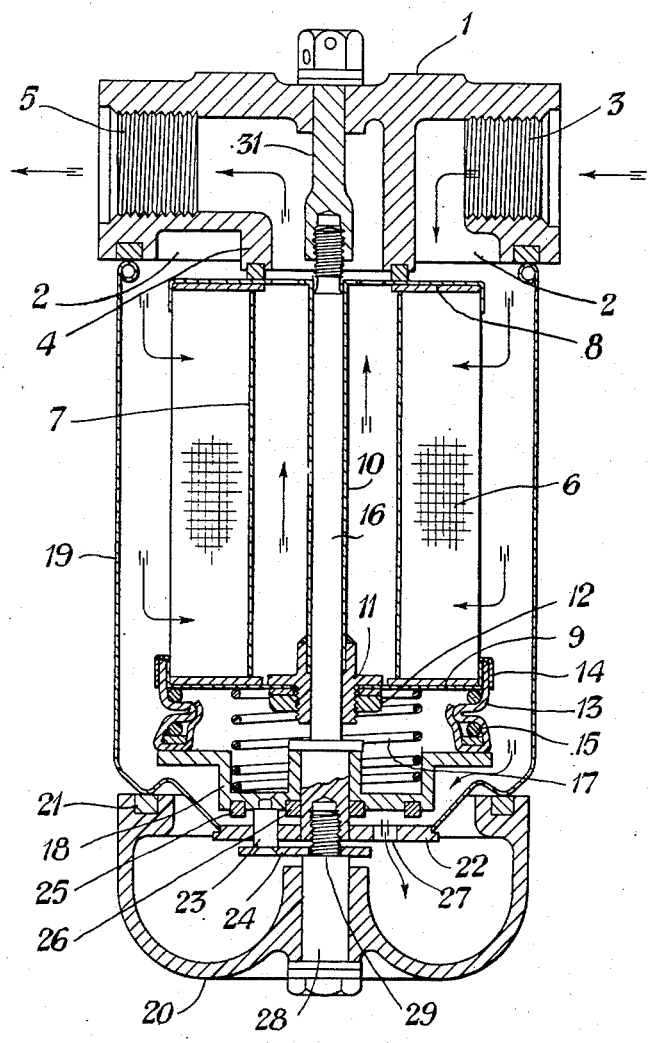

Oct. 3, 1950

C. G. VOKES 2,524,336

FILTER

Filed Aug. 13, 1946

2 Sheets-Sheet 1

Inventor
Cecil G. Vokes
By ...
Atty.

Oct. 3, 1950 C. G. VOKES 2,524,336
FILTER
Filed Aug. 13, 1946 2 Sheets-Sheet 2
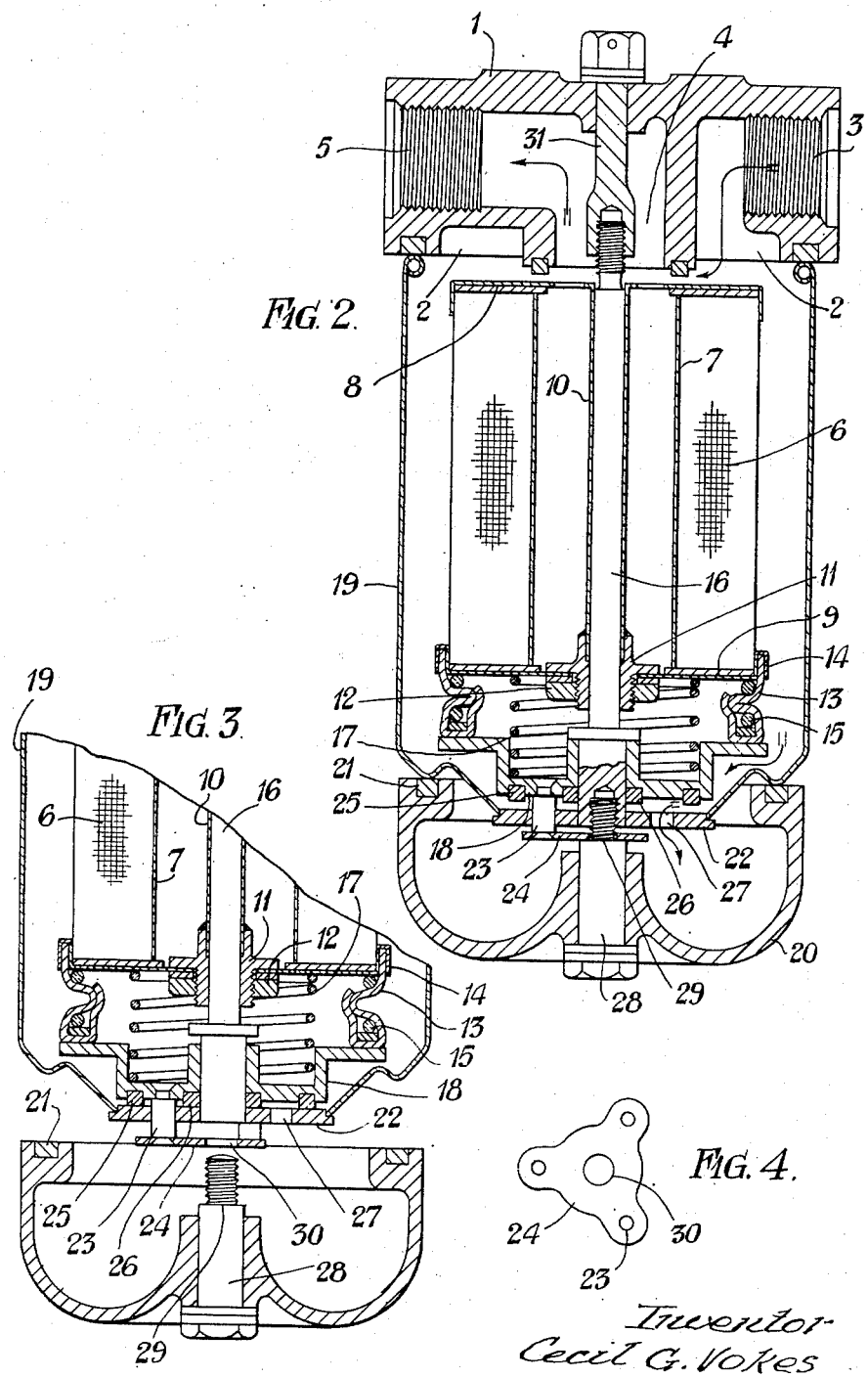
Inventor
Cecil G. Vokes Patented Oct. 3, 1950

2,524,336

UNITED STATES PATENT OFFICE 2,524,336

FILTER

Cecil Gordon Vokes, Guildford, England, assignor to Vokes Limited, Guildford, England, a British company Application August 13, 1946, Serial No. 690,097
In Great Britain March 16, 1945

5 Claims. (Cl. 210—187)

It has been well-known for many years to incorporate in filters an automatic by-pass arrangement which will permit flow of unfiltered fluid (liquid or gaseous) to continue in case the filter screen becomes so clogged (or, in the case of filtering oil or the like, when the oil is so cold) as to result in a predetermined drop of pressure ("back pressure") across the filter screen.

An arrangement extensively used at the present time includes a filter unit having a wall or walls forming the filter screen, the arrangement being such that the interior of the unit or space enclosed by the filter screen is on the dirty side. The unit moves bodily under a predetermined back pressure so that it becomes by-passed and the dust or sludge collected in the unit do not get mixed into the flow of unfiltered fluid.

When filtering from inside to outside the filter unit, the impurities inside the unit are not readily removable without removing the unit.

The present invention is concerned to facilitate the periodical removal of dirt or sludge from filters with units of the outside to inside filtering type (and especially such filters in which a predetermined back pressure opens an automatic by-pass) without the necessity of stopping the operation of the filter until the unit is so clogged as to require cleaning or replacement if the back pressure is to be kept below the predetermined value. The collection of dirt or sludge in a sump below the unit and its periodical removal should make it less prone to build up against the filter screen, thus giving a longer time before the unit has to be removed for cleaning or replacement.

In filters according to the invention a detchable sump provided at the bottom of the filter body is combined with a valve which opens to give access to the sump or closes to shut off the filter body when the sump is removed in such a manner that it necessarily opens when the sump is fitted and necessarily closes when the sump is removed. In the preferred forms it is urged towards shut position and is opened by screwing up the bolt or tightening other fastening means to secure the sump in position, so that it automatically shuts when the fastening is undone. When a compression spring is used to hold the unit in position in the filter casing, the same spring may be employed to close the valve.

Other parts of the invention are embodied in a typical form which will now be described with reference to the accompanying drawings showing the removable sump applied to a filter having a flexible shield attached to the bottom end plate of a filter unit.

In the drawings—

Fig. 1 is a central vertical section under normal operating conditions with the valve open, Fig. 2 is a similar view under conditions of excessive resistance to flow through the filter screen (back pressure), Fig. 3 is a fragmentary view showing the sump removed and the valve closed, and Fig. 4 is a detail.

The general construction of the filter is as follows:

A header 1 has a substantially annular inlet space 2 receiving fluid to be filtered from inlet pipe socket 3 and a central outlet spigot 4 delivering filtered fluid to outlet socket 5.

The filter unit comprises a star-shaped filter screen 6 surrounding a perforated tube 7 and held between upper and lower end caps 8, 9. The upper end cap 8 is welded to a central tube 10 which is in turn welded to a flanged fitting 11 to which the lower end cap 9 is secured by nut 12. A flexible shield comprising a felt cylinder 13 secured to the lower end cap by a band 14 and stiffened by coils 15 permits the unit to move up or down, the tube 10 sliding on a central bolt 16. The flexible shield 13 encloses a space in or about which lies a compression spring 17 between the unit and the sliding valve 18. The bottom of the filter body 19 is formed to make joint with the detachable sump 20 on joint 21 at its periphery and has a central flat perforated plate 22. The valve 18 houses the bottom of the compression spring 17 and is slidable on an enlarged portion of the assembly bolt 16 above the perforated plate 22. Studs 23 passing through the plate 22 secure it to an operating plate or spider 24 under the bottom, the valve having concentric seating rings 25, 26 so that the holes 27 in the perforated plate 22 and those in which the studs slide are sealed off when the valve is closed. The sump 20 is secured by a central stud 28 which screws into the end of the assembly bolt 16 and which has a shoulder 29 which engages the operating plate 24 through a hole 30 in which the screwed end of the stud 28 passes to engage the assembly bolt. The valve 18 is thus lifted when the securing stud 28 is screwed up and access is given through the holes 27 in the perforated plate from the filter body to the sump. As the securing stud 28 is unscrewed, the compression spring 17 closes the valve 18 and the bottom of the filter body 19 is sealed off above the sump (see Fig. 3).

The operation of the by-pass is as follows:

When oil is cold and the predetermined back pressure exceeded for that reason or because the filter screen is clogged, the greater resultant pressure is on top of the unit and it moves down against the compression spring and opens the by-pass between the upper end cap 8 and the spigot 4 (see Fig. 2). The valve 18 (held open by the securing bolt when the sump is in position) serves as the abutment for the lower end of the spring 17. A socket piece 31, captive in the header 1, is screwed on to the assembly bolt 16 to hold the body or casing 19 against the header. The flexible shield permits the independent movements of unit and valve and may be of suitable material to serve as additional filtering area if desired.

I claim:

1. A filter comprising a header having an inlet and an outlet, a casing body, a detachable sump, a central spindle within said casing body, a filter element removably mounted upon said central spindle, a valve controlling communication between said casing body and said sump, means urging the valve towards closed position, a device removably engageable with one end of the central spindle for securing said sump to said casing body, abutment means carried by said securing device for engaging the valve to open the valve when the said securing device is in operative position to secure said sump to said casing body, and another securing device removably engageable with the other end of the central spindle for securing said casing body to said header and securing said filter element on said central spindle within said casing body.

2. A filter as defined in claim 1 wherein said means urging the valve towards closed position comprises a spring engaging between the valve and the filter element and urging the filter element into fluid tight connection with the header outlet.

3. A filter as defined in claim 2, comprising a flexible shield enclosing a space between the valve and the filter element and permitting relative movement for the valve to open and the filter element to move along the contral spindle towards the valve against the pressure of said spring when operating conditions require such movement.

4. A filter unit comprising a casing having an inlet and an outlet and an opening in the bottom portion thereof, a filter element movably mounted in said casing for normal engagement with said casing to intercept direct passage between said inlet and outlet but movable upon clogging away from casing engagement to permit such direct passage, a sump removably connected to said casing and in communication therewith through said opening, a valve movably mounted in said casing for closing said opening, an abutment carried by said sump for engagement with said valve to move said valve from said opening when said sump is connected to said casing, and a spring interposed between said valve and said filter element and biasing said valve toward said opening and said filter element toward engagement with said casing.

5. A filter unit as set forth in claim 4 wherein said filter element comprises a cage having an opening for communication with said casing outlet, said cage opening being in the end opposite that engaged by said spring, and a flexible sleeve surrounds the space between said valve and said filter cage and encloses said spring to permit relative movement of said valve and cage and preclude external end pressure on said cage that would prevent movement thereof when clogged.

CECIL GORDON VOKES.

REFERENCES CITED

The following references are of record in the file of this patent:

UNITED STATES PATENTS

| Number | Name | Date |
| --- | --- | --- |
| 908,308 | Mueller | Dec. 29, 1908 |
| 1,365,644 | Applin | Jan. 18, 1921 |
| 1,446,056 | Misner | Feb. 20, 1923 |
| 1,745,248 | De Guenther | Jan. 28, 1930 |
| 1,820,790 | Feezer | Aug. 25, 1931 |
| 1,901,484 | Winslow | Mar. 14, 1933 |
| 1,933,409 | Berman | Oct. 31, 1933 |
| 2,287,344 | Easton et al. | June 23, 1942 |
| 2,354,380 | Kasten | July 25, 1944 |
| 2,387,368 | Vokes | Oct. 23, 1945 |
| 2,406,308 | Vokes et al. | Aug. 20, 1946 |